United States Patent
Barsness et al.

(10) Patent No.: US 10,235,268 B2
(45) Date of Patent: *Mar. 19, 2019

(54) STREAMS ANALYSIS TOOL AND METHOD

(71) Applicant: International Business Machines Corporation, Armonk, NY (US)

(72) Inventors: Eric L. Barsness, Pine Island, MN (US); Daniel E. Beuch, Rochester, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,438

(22) Filed: May 18, 2017

(65) Prior Publication Data

US 2018/0336119 A1    Nov. 22, 2018

(51) Int. Cl.
 *G06F 11/36* (2006.01)

(52) U.S. Cl.
 CPC ........ *G06F 11/3612* (2013.01); *G06F 11/362* (2013.01); *G06F 11/3604* (2013.01)

(58) Field of Classification Search
 CPC . G06F 11/3604; G06F 11/3612; G06F 11/362
 USPC ........................... 717/124–135; 714/37, 38.1
 See application file for complete search history.

(56) References Cited

U.S. PATENT DOCUMENTS

| 7,747,737 | B1 | 6/2010 | Apte et al. | |
| 7,834,875 | B2 | 11/2010 | Liu et al. | |
| 7,966,340 | B2 | 6/2011 | Friedman et al. | |
| 8,732,300 | B2 | 5/2014 | Barsness et al. | |
| 9,342,385 | B2 | 5/2016 | Branson et al. | |
| 2002/0129343 | A1* | 9/2002 | Pinter | G06F 8/434 717/140 |
| 2009/0006399 | A1* | 1/2009 | Raman | G06F 17/30498 |
| 2013/0305225 | A1* | 11/2013 | Branson | G06F 11/362 717/128 |

(Continued)

OTHER PUBLICATIONS

Seshadri et al., "Sequence Query Processing." ACM SIGMOD Record. vol. 23. No. 2. ACM, 1994.

(Continued)

*Primary Examiner* — Qing Chen
(74) *Attorney, Agent, or Firm* — Martin & Associates, LLC; Derek P. Martin

(57) ABSTRACT

A streams analysis tool allows a user to define one or more buckets according to a specified tuple collection criteria for each bucket. The specified tuple collection criteria for each bucket defines some way to distinguish one data tuple from another. The specified tuple collection criteria for each bucket is therefore used to distinguish data tuples that satisfy the specified tuple collection criteria from data tuples that do not satisfy the specified tuple collection criteria. When a data tuple satisfies the specified tuple collection criteria for a bucket, the data tuple is stored in the bucket. In addition, data tuples preceding or succeeding the data tuple may also be stored in the bucket, as determined by the specified tuple collection criteria. The data tuples in each bucket are analyzed, and based on the analysis a streams manager can change how future data tuples are processed by the streaming application.

9 Claims, 5 Drawing Sheets

(56) References Cited

U.S. PATENT DOCUMENTS

| | | | | |
|---|---|---|---|---|
| 2014/0089373 A1* | 3/2014 | Branson | ............ | H04L 29/08135 709/201 |
| 2014/0089929 A1* | 3/2014 | Branson | ............ | H04L 29/08135 718/102 |
| 2014/0236920 A1* | 8/2014 | Branson | ................. | H04L 65/60 707/713 |
| 2015/0324508 A1 | 11/2015 | Sather et al. | | |

OTHER PUBLICATIONS

Cipriani et al., "M-TOP: Multi-Target Operator Placement of Query Graphs for Data Streams." Proceedings of the 15th Symposium on International Database Engineering & Applications, ACM, 2011.

Soule et al. "Dynamic Expressivity with Static Optimization for Streaming Languages." Proceedings of the 7th ACM International Conference on Distributed Event-based Systems, ACM, 2013.

Barsness et al., "Streams Analysis Tool and Method" U.S. Appl. No. 15/806,553, filed Nov. 8, 2017.

IBM, Appendix P—List of IBM Patents or Patent Applications Treated As Related, dated Feb. 1, 2018.

* cited by examiner

Filter
Program Operator C to
Discard (filter) All Tuples
with 555-123-4567

FIG. 8

Prioritize
Program Operator F to
Provide Priority
Processing of Tuples with
555-123-4567

FIG. 9

STREAMS ANALYSIS TOOL AND METHOD

BACKGROUND

1. Technical Field

This disclosure generally relates to streaming applications, and more specifically relates to analysis of streaming applications.

2. Background Art

Streaming applications are known in the art, and typically include multiple operators coupled together in a flow graph that process streaming data in near real-time. An operator typically takes in streaming data in the form of data tuples, operates on the data tuples in some fashion, and outputs the processed data tuples to the next processing element. Streaming applications are becoming more common due to the high performance that can be achieved from near real-time processing of streaming data.

Known tools for analyzing streaming applications provide views of what is going on in the flow graph. Known views allow sampling some relatively small number of tuples to see if a streaming application is behaving as expected. For example, a view of an operator can tell a person when the operator is not processing data tuples if the operator has stopped for some reason. However, sampling some small number of data tuples may not allow for seeing data tuples related to transient events that can cause problems when potentially hundreds of thousands or millions of data tuples are being processed by a streaming application.

BRIEF SUMMARY

A streams analysis tool allows a user to define one or more buckets according to a specified tuple collection criteria for each bucket. The specified tuple collection criteria for each bucket defines some way to distinguish one data tuple from another. The specified tuple collection criteria for each bucket is therefore used to distinguish data tuples that satisfy the specified tuple collection criteria from data tuples that do not satisfy the specified tuple collection criteria. When a data tuple satisfies the specified tuple collection criteria for a bucket, the data tuple is stored in the bucket. In addition, data tuples preceding or succeeding the data tuple may also be stored in the bucket, as determined by the specified tuple collection criteria. The data tuples in each bucket are analyzed, and based on the analysis a streams manager can change how future data tuples are processed by the streaming application.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 8 is a diagram showing a filter function that can be fed back into the streaming application as a result of analyzing the data tuples in buckets; and FIG. 9 is a diagram showing a prioritize function that can be fed back into the streaming application as a result of analyzing the data tuples in buckets.

DETAILED DESCRIPTION

The disclosure and claims herein are directed to a streams analysis tool that allows a user to define one or more buckets according to a specified tuple collection criteria for each bucket. The specified tuple collection criteria for each bucket defines some way to distinguish one data tuple from another. The specified tuple collection criteria for each bucket is therefore used to distinguish data tuples that satisfy the specified tuple collection criteria from data tuples that do not satisfy the specified tuple collection criteria. When a data tuple satisfies the specified tuple collection criteria for a bucket, the data tuple is stored in the bucket. In addition, data tuples preceding or succeeding the data tuple may also be stored in the bucket, as determined by the specified tuple collection criteria. The data tuples in each bucket are analyzed, and based on the analysis a streams manager can change how future data tuples are processed by the streaming application.

Figure 1:
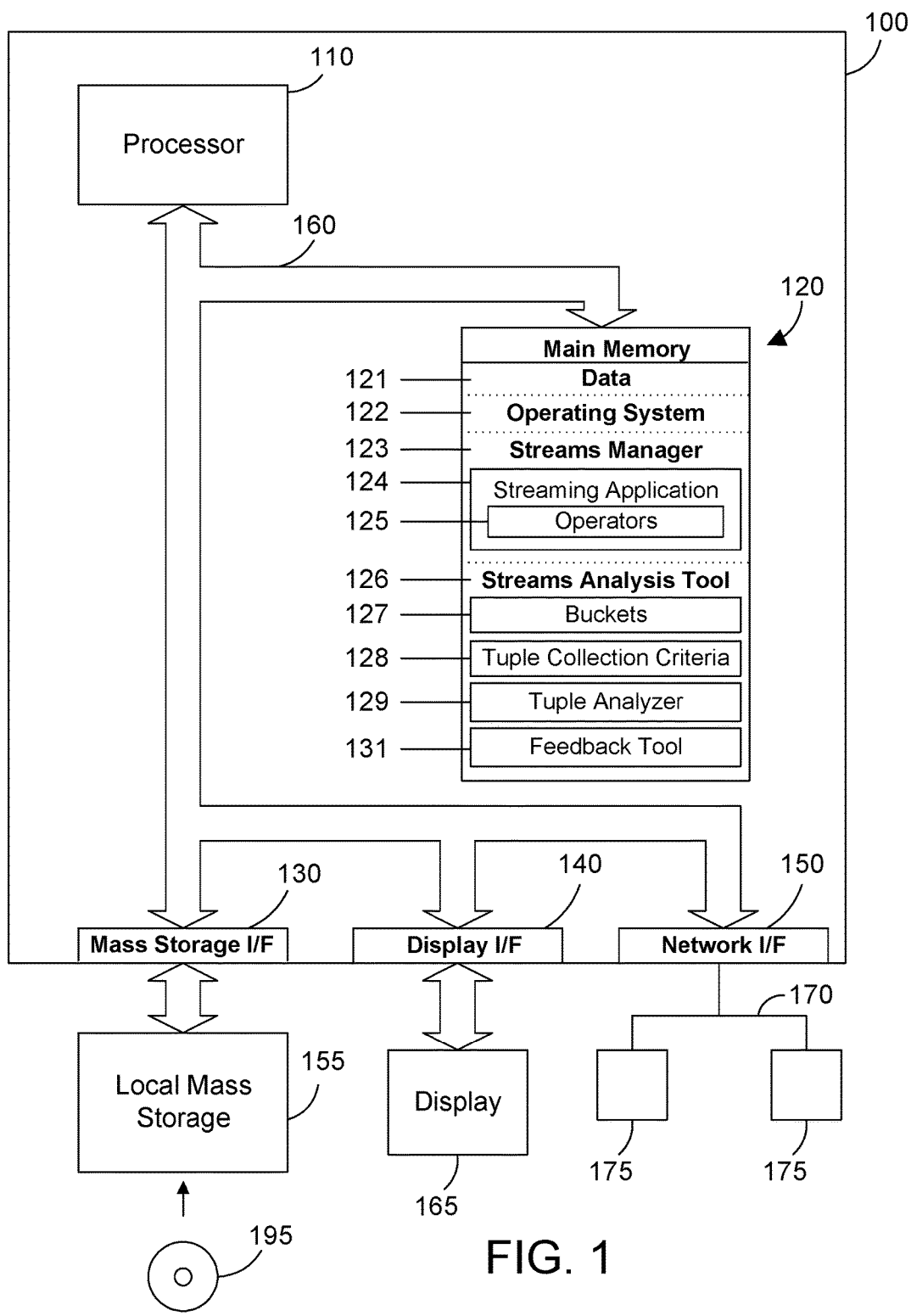
FIG. 1 is a block diagram of a computer system that includes a streams analysis tool that can analyzed data tuples in a streaming application.

Referring to FIG. 1, a computer system 100 is one suitable implementation of a server computer system that includes a streams analysis tool as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, a streams manager 123, and a streams analysis tool 126. Data 121 represents any data that serves as input to or output from any program in computer system 100. Operating system 122 is a multitasking operating system, such as AIX or LINUX. The streams manager 123 is software that provides a run-time environment that executes a streaming application 124. The streaming application 124 preferably comprises a flow graph that includes processing elements that include operators 125 that process data tuples, as is known in the art.

Figure 2:
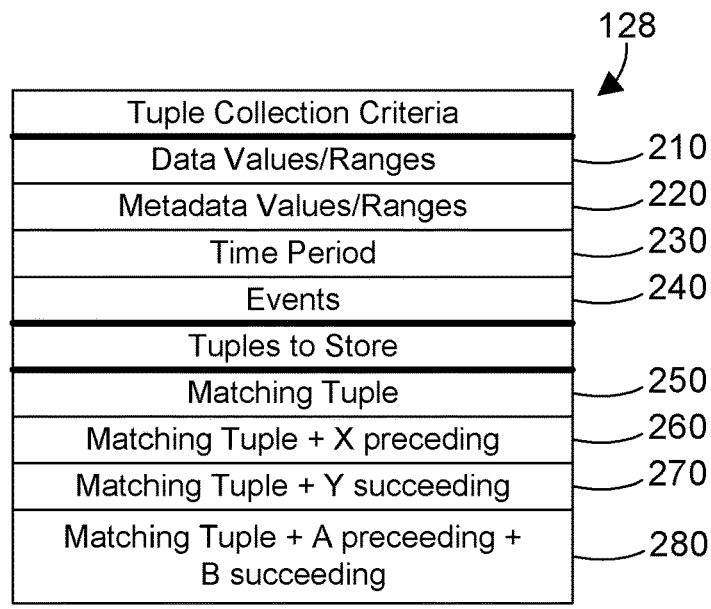
FIG. 2 is a table showing possible items that could be specified in tuple collection criteria for a bucket.

The streams analysis tool 126 is software that provides a way to analyze the streaming application 124. Streams analysis tool 126 includes buckets 127, tuple collection criteria 128, tuple analyzer 129, and feedback tool 131. Buckets 127 are preferably defined by a user. Each bucket has one or more corresponding tuple collection criteria 128 that defines which tuples are stored in the bucket. Tuple collection criteria 128 specifies any suitable criteria that can be used to distinguish data tuples from each other. Referring to FIG. 2, examples of items that could be included in tuple collection criteria 128 include data values and/or ranges 210, metadata values and/or ranges 220, time period 230, and events 240. All data tuples include data and metadata. Metadata can include any suitable information about the data tuple. Examples of metadata for a data tuple include a history of where the data tuple came from, such as a series of operators or machines; a timestamp of when the data tuple was last changed and by which operator; the data source for where the data came from; a timestamp of when the data tuple entered the system; a total number of operators the data tuple has traversed; metrics associated with the operator, such as whether it caused exceptions in prior operators; etc. When the tuple collection criteria 128 for a given bucket 127 specifies a value or range of data 210, when a data tuple has a data value that matches the value or falls within the specified range, the data tuple satisfies the value or range of data, and is therefore stored in the corresponding bucket. When the tuple collection criteria 128 for a given bucket 127 specifies a value or range of metadata 220, when a data tuple has a metadata value that matches the value or falls within the specified range, the data tuple satisfies the value or range of metadata, and is therefore stored in the corresponding bucket. The time period 230 allows a user to specify a time period of interest. The time period could be specified, for example, using clock time, or could be specified as an offset from the time the streaming application began execution. Events 240 can include any suitable event that could be detected during the execution of the streaming application 124. For example, in a streaming application that processes telephone calls, a dropped call could be an event 240. Tuple collection criteria 128 may additionally specify tuples to store when the specified criteria is satisfied. Tuples to store can include the matching data tuple 250, the matching data tuple plus some specified number X of preceding data tuples 260, the matching data tuple plus some specified number Y of succeeding data tuples 270, and the matching data tuple plus a specified number A of preceding data tuples and a specified number B of succeeding data tuples 280. Note the various criteria shown by way of example in FIG. 2 could use logical operators to create any suitable logical combination of items to define the tuple collection criteria 128. For example, a data range 210 could be specified logically ANDed with a time period 230, which means that only tuples that have the specified data within the data range 210 during time period 230 will be stored in the corresponding bucket.

Referring back to FIG. 1, the streams analysis tool 126 includes a tuple analyzer 129. The tuple analyzer 129 can be used to analyze tuples in one or more of the buckets 127 to determine performance and behavior of the streaming application 124. The tuple analyzer 129 can present to a user individual tuple values, and can additionally provide trends or any other suitable information that can be derived or otherwise determined from data tuples in the buckets. Streams analysis tool 126 also includes a feedback tool 131. Based on the analysis performed by the tuple analyzer 129, the feedback tool 131 can communicate with the streams manager 123 regarding possible changes to the streaming application 124 for processing future data tuples. For example, the feedback tool 131 could indicate to the streams manager 123 to filter certain data tuples or to prioritize the processing of certain data tuples. While the streams analysis tool 126 is shown in FIG. 1 separate from the streams manager 124, it is equally within the scope of the disclosure and claims herein to have the streams analysis tool 126 as part of the streams manager 123.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, streams manager 123 and streams analysis tool 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124, and executes the streams analysis tool 126.

Although computer system 100 is shown to contain only a single processor and a single system bus, those skilled in the art will appreciate that a streams analysis tool as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
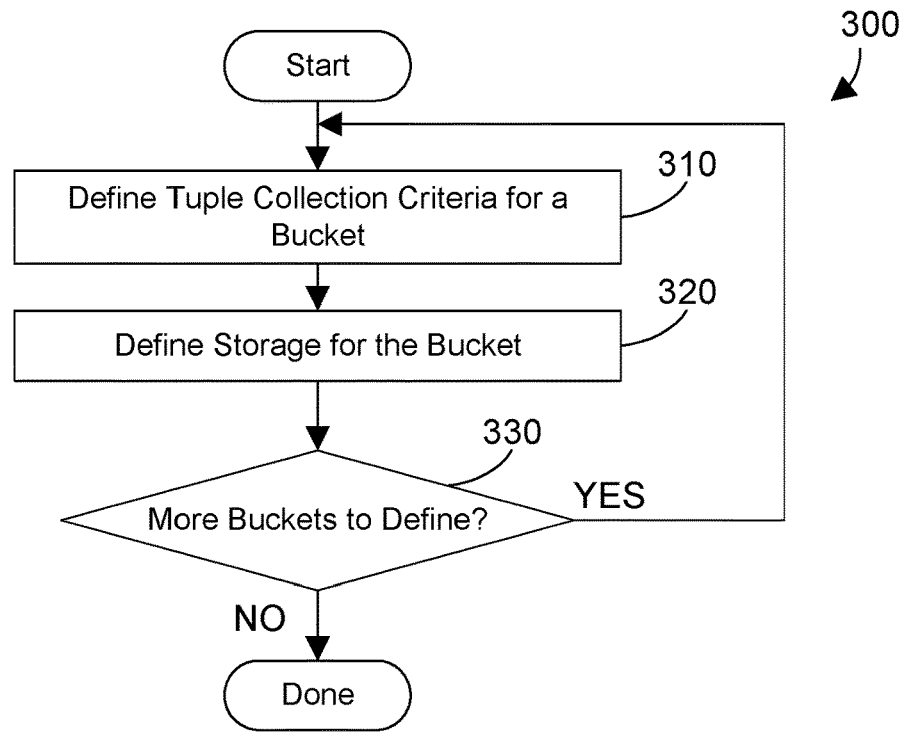
FIG. 3 is a flow diagram of a method for defining buckets and corresponding tuple collection criteria for each bucket.

Referring to FIG. 3, a method 300 is preferably performed by a human user, such as a system administrator or a programmer who is analyzing or debugging a streaming application. Method 300 begins by defining tuple collection criteria for a bucket (step 310). The tuple collection criteria for a bucket can include any or all of the criteria 210, 220, 230, 240 and tuples to store 250, 260, 270 and 280 shown in FIG. 2 and described above, individually or in any suitable combination of logical expression. Storage is defined for the bucket (step 320). Note the storage for the bucket defined in step 320 could be automatically defined by the streams analyzer as a result of the user defining the tuple collection criteria in step 310, or could be manually defined by the user. When there are more buckets to define (step 330=YES), method 300 loops back to step 310 and continues until there are no more buckets to define (step 330=NO). Method 300 is then done.

Figure 4:
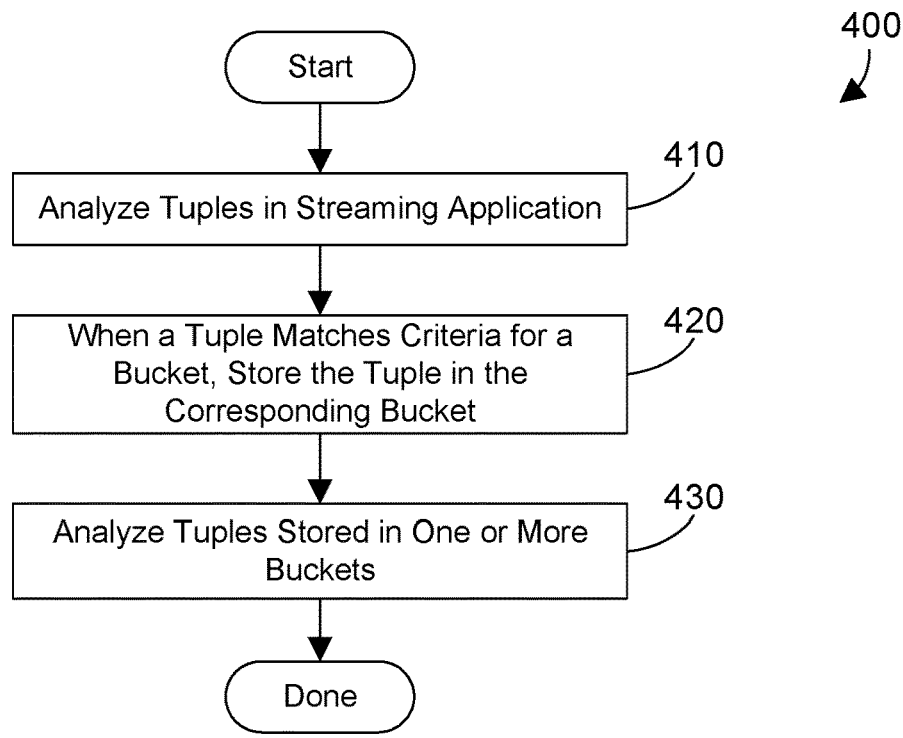
FIG. 4 is a flow diagram of a method for storing data tuples in one or more buckets and analyzing the data tuples stored in the buckets.

Once method 300 is used to define one or more buckets and the corresponding tuple collection criteria for each bucket, the streams analysis tool 126 may analyze the streaming application by performing method 400 in FIG. 4. The data tuples in the streaming application are analyzed (step 410). When a data tuple matches the tuple collection criteria for a bucket, the tuple is stored in that bucket (step 420). The tuples stored in the one or more buckets may then be analyzed (step 430). Method 400 provides much better debugging and performance analysis capabilities than known views in known streams managers, because it captures all tuples that match specified tuple collection criteria for all defined buckets, instead of sampling a relatively small number of relevant tuples. The analysis performed in step 430 may be used for any suitable purpose, including to determine performance of the streaming application, to debug the streaming application, etc.

Figure 5:
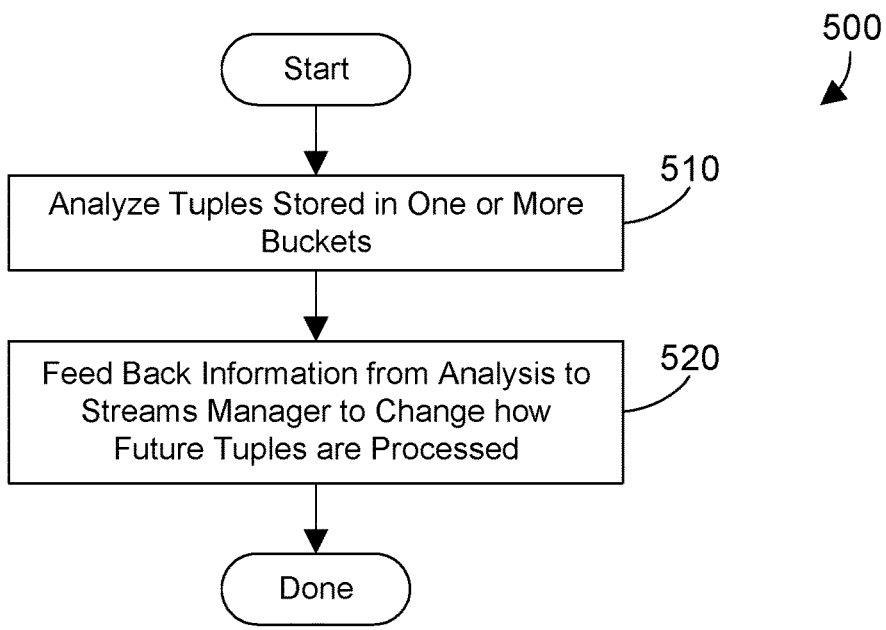
FIG. 5 is a flow diagram of a method for feeding back information from the analysis of data tuples in the buckets to change how future tuples are processed in the streaming application.

Referring to FIG. 5, method 500 is preferably executed by the streams analysis tool 126 shown in FIG. 1. The data tuples stored in one or more buckets are analyzed (step 510). In response to the analysis, information is fed back to the streams manager to change how future tuples are processed by the streaming application (step 520). Examples of changing how future tuples are processed including filtering of data tuples and prioritization of data tuples. An example is provided below to illustrate both filtering of data tuples and prioritization of data tuples based on the analysis of data tuples in one or more buckets. Of course, other changes to how future tuples are processed by the streaming application are also within the scope of the disclosure and claims herein.

Figure 6:
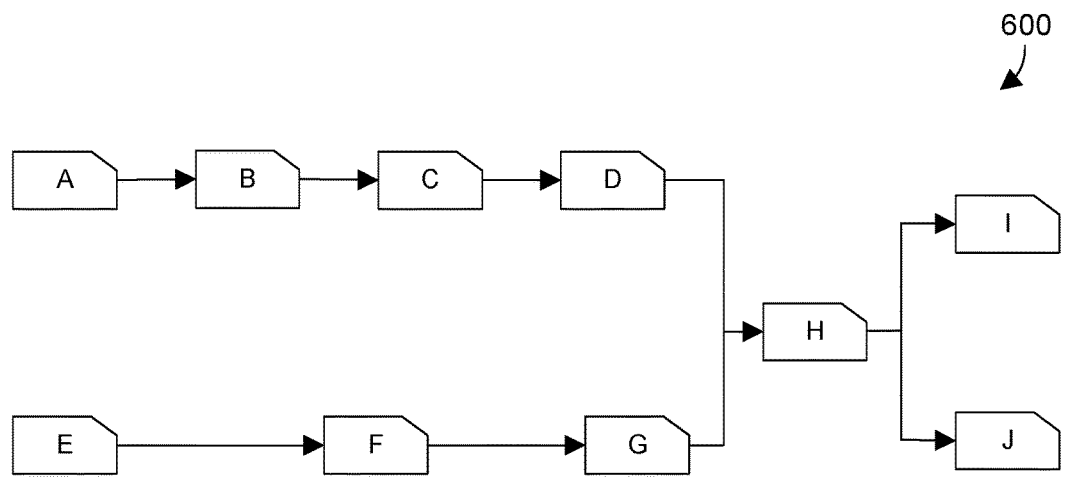
FIG. 6 is a flow diagram of a sample streaming application.

Referring to FIG. 6, an extremely simplified streaming application 600 is shown for the purposes of illustrating the concepts herein. The streaming application 600 includes ten operators A, B, C, D, E, F, G, H, I and J. Operator A produces data tuples that are sent to operator B. Operator B operates on the data tuples received from operator A and sends the resulting data tuples to operator C. Operator C operates on the data tuples received from operator B and sends the resulting data tuples to operator D. In similar fashion, operator E produces data tuples that are sent to operator F, which processes those data tuples and sends resulting data tuples to operator G. Operators D and G both send their data tuples to operator H, which processes these data tuples and sends some data tuples to operator I and other data tuples to operator J. We assume for this simple example that streaming application 600 processes streaming data for internet protocol (IP) telephone calls.

Figure 7:
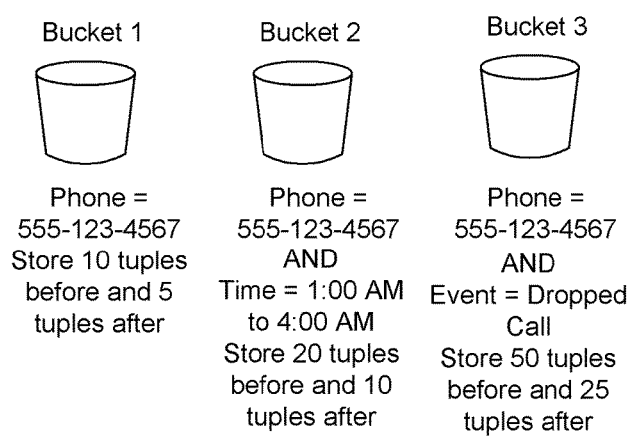
FIG. 7 is a diagram showing buckets with their respective tuple collection criteria defined for the streaming application in FIG. 6.

FIG. 7 shows buckets defined by a user for the streaming application 600 in FIG. 6. We assume the user is debugging the streaming application 600, and has found the streaming application 600 sometimes does not act as expected when a phone call comes in from a particular telephone number. We assume the user has defined three buckets shown in FIG. 7, which include Bucket 1, Bucket 2 and Bucket 3. Each bucket has corresponding tuple collection criteria, shown below each bucket. Thus, Bucket 1 is for data tuples that have a phone number with a value of 555-123-4567, and the specified criteria specifies to store ten tuples before and five tuples after each matching tuple. This means when a data tuple matches the specified phone number, a total of sixteen tuples are stored in Bucket 1.

We assume the problem with calls from the particular telephone number is most prevalent when a call from that telephone number is received between 1:00 AM and 4:00 AM. The user has thus defined Bucket 2 with the same phone number logically ANDed with a time range of 1:00 AM to 4:00 AM, and has specified to store 20 tuples before and 10 tuples after. We assume the problem the user is looking for is a dropped call from this phone number. The user defines Bucket 3 with tuple collection criteria that includes the phone number logically ANDed with the event of a dropped call, and to store 50 tuples before and 25 tuples after. Note that each of the buckets in FIG. 7 will contain different sets of data tuples that can help the user determine a cause of the problem in the streaming application. As the streaming application 600 runs, the streams analysis tool analyzes each data tuple to see if it satisfies any of the tuple collection criteria for Bucket 1, Bucket 2 and Bucket 3. Let's assume a phone call comes in a 11:24 PM from 555-123-4567. For each data tuple that includes this phone number, the matching data tuples and the 10 preceding data tuples and the 5 succeeding data tuples are stored in Bucket 1. This data tuple is not stored in Bucket 2 because the time of 11:24 PM in the data tuple does not match the time period of 1:00 AM to 4:00 AM specified in the tuple collection criteria for Bucket 2. Should the call from this phone number be dropped, the 50 tuples before the call drops and the 25 tuples after are stored in Bucket 3. This simple example shows how data tuples can be stored in different buckets as a streaming application runs according to specified tuple collection criteria for each bucket.

Note that buckets as shown in FIG. 7 can be defined at any suitable level of granularity according to the needs of the user. Thus, buckets could be defined for a single operator, for a group of operators, or for the entire streaming application.

In addition to analyzing the data tuples in the buckets in FIG. 7, the information gleaned from the analysis can be fed back into the streaming application to change how the streaming application processes future data tuples. For example, let's assume a data tuple with this specified phone number that is processed by operators A, B and C is always dropped by the time it is processed by operator D. The streaming application can program Operator C in the flow graph to filter out (or discard) all data tuples with the specified phone number, as shown in FIG. 8. Another example of feeding back information from the analysis of the data tuples in one or more buckets is the application can prioritize processing of data tuples by an operator. Referring to the streaming application in FIG. 6, let's assume operator F sometimes gets bogged down and has several data tuples build up in its input buffer. Let's further assume the specified phone number needs to be treated as a priority phone call that is processed even if phone calls of lower priority are dropped. The streams manager can program Operator F to provide priority processing of tuples with the phone number, as shown in FIG. 9. For example, let's assume Operator F has the following tuples that arrive in its input buffer for processing in the following order: T1, T2, T3, T4, T5, T6, T7, T8. We assume T2 through T8 are in Operator F's input buffer while Operator F processes T1. We further assume data tuple T7 has the specified phone number that should be given priority. This means even though tuple T7 arrived after tuples T2, T3, T4, T5 and T6, Operator F will process tuple T7 out of order because data tuples with the specified phone number are given priority over data tuples with other phone numbers. Note while filtering and prioritization of data tuples are examples of changes the streams manager can make to the streaming application according to the analysis of data tuples in one or more buckets, the disclosure and claims herein expressly extend to the streams manager making any suitable change to the streaming application as a result of the analysis of the data tuples in one or more buckets.

The examples provided herein are extremely simplified to illustrate the general concepts of storing data tuples in buckets according to user-defined tuple collection criteria. Most streaming applications are significantly more complex than shown in the example herein. However, one skilled in the art will appreciate the concepts disclosed and claimed herein can extend to a streaming application of any suitable level of complexity with any suitable number buckets and corresponding criteria. In addition, the terms "tuple" and "data tuple" as used herein are synonyms.

A streams analysis tool allows a user to define one or more buckets according to a specified tuple collection criteria for each bucket. The specified tuple collection criteria for each bucket defines some way to distinguish one data tuple from another. The specified tuple collection criteria for each bucket is therefore used to distinguish data tuples that satisfy the specified tuple collection criteria from data tuples that do not satisfy the specified tuple collection criteria. When a data tuple satisfies the specified tuple collection criteria for a bucket, the data tuple is stored in the bucket. In addition, data tuples preceding or succeeding the data tuple may also be stored in the bucket, as determined by the specified tuple collection criteria. The data tuples in each bucket are analyzed, and based on the analysis a streams manager can change how future data tuples are processed by the streaming application.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for running streaming applications, the computer-implemented method comprising:

executing a streams manager that executes a streaming application that comprises a flow graph that includes a plurality of operators that process a plurality of data tuples;

a user defining a first bucket that specifies first tuple collection criteria for distinguishing some of the plurality of data tuples in the streaming application from other of the plurality of data tuples in the streaming application;

analyzing the plurality of data tuples as the streaming application is executed by the streams manager;

storing each of the plurality of data tuples that satisfies the first tuple collection criteria in the first bucket;

analyzing data tuples in the first bucket; and feeding back information from analyzing the data tuples in the first bucket to the streams manager to change how the streaming application processes future data tuples, wherein, in response to the information fed back from the streams analysis tool, the streams manager causes filtering of at least one data tuple in the flow graph.

2. The computer-implemented method of claim 1 wherein the first tuple collection criteria specifies at least one data value or range.

3. The computer-implemented method of claim 1 wherein the first tuple collection criteria specifies at least one metadata value or range.

4. The computer-implemented method of claim 1 wherein the first tuple collection criteria specifies a time range.

5. The computer-implemented method of claim 1 wherein the first tuple collection criteria specifies at least one event.

6. The computer-implemented method of claim 1 wherein the first tuple collection criteria specifies a first number of tuples preceding a matching data tuple and a second number of tuples succeeding the matching data tuple.

7. The computer-implemented method of claim 1 further comprising:

defining a second bucket that specifies second tuple collection criteria[N]$_z$ wherein the first tuple collection criteria and the second tuple collection criteria are user-defined.

8. A method for analyzing a streaming application, the method comprising:

executing a streams manager that executes a streaming application that comprises a flow graph that includes a plurality of operators that process a plurality of data tuples;

a user defining a first bucket that specifies first tuple collection criteria for distinguishing some of the plurality of data tuples in the streaming application from other of the plurality of data tuples in the streaming application, wherein the first tuple collection criteria comprises:

at least one data value or range;

at least one time range; and a first number of tuples preceding a matching data tuple and a second number of tuples succeeding the matching data tuple;

the user defining a second bucket that specifies second tuple collection criteria, wherein the second tuple collection criteria comprises:

at least one metadata value or range; and at least one event;

analyzing the plurality of data tuples as the streaming application is executed by the streams manager;

storing each data tuple of the plurality of data tuples that satisfies the first tuple collection criteria in the first bucket;
storing each data tuple of the plurality of data tuples that satisfies the second tuple collection criteria in the second bucket;
analyzing the plurality of data tuples in the first bucket;
analyzing the plurality of data tuples in the second bucket; and
feeding back information from analyzing the plurality of data tuples in the first bucket and the second bucket to the streams manager to change how the streaming application processes future data tuples, wherein, in response to the information fed back from the streams analysis tool, the streams manager performs at least one of:
  filtering at least one data tuple in the flow graph; and
  prioritizing processing of at least one data tuple in the flow graph.

9. A computer-implemented method executed by at least one processor for running streaming applications, the computer-implemented method comprising:

executing a streams manager that executes a streaming application that comprises a flow graph that includes a plurality of operators that process a plurality of data tuples;
a user defining a first bucket that specifies first tuple collection criteria for distinguishing some of the plurality of data tuples in the streaming application from other of the plurality of data tuples in the streaming application;
analyzing the plurality of data tuples as the streaming application is executed by the streams manager;
storing each of the plurality of data tuples that satisfies the first tuple collection criteria in the first bucket;
analyzing data tuples in the first bucket; and
feeding back information from analyzing the data tuples in the first bucket to the streams manager to change how the streaming application processes future data tuples, wherein, in response to the information fed back from the streams analysis tool, the streams manager prioritizes processing of at least one data tuple in the flow graph.

* * * * *